United States Patent [19]

Sikdar et al.

[11] Patent Number: 5,916,305
[45] Date of Patent: Jun. 29, 1999

[54] PATTERN RECOGNITION IN DATA COMMUNICATIONS USING PREDICTIVE PARSERS

[75] Inventors: Somsubhra Sikdar, San Jose; Jagannath N. Raghu, Sunnyvale, both of Calif.

[73] Assignee: Shomiti Systems, Inc., San Jose, Calif.

[21] Appl. No.: 08/746,012

[22] Filed: Nov. 5, 1996

[51] Int. Cl.[6] .................................................. G06F 17/27
[52] U.S. Cl. .......................................... 709/236; 709/230
[58] Field of Search .............................. 395/200.66, 709, 395/500, 200.67, 200.6; 364/571.07, 572; 370/975

[56] References Cited

U.S. PATENT DOCUMENTS

| 5,193,192 | 3/1993 | Seberger ................................. | 395/709 |
| 5,351,243 | 9/1994 | Kalkunte et al. ....................... | 370/475 |
| 5,414,650 | 5/1995 | Hekhuis ................................. | 364/715.02 |
| 5,421,001 | 5/1995 | Methe .................................... | 395/500 |
| 5,805,808 | 9/1998 | Hasani et al. .......................... | 395/200.2 |

Primary Examiner—Mehmet B. Geckil
Attorney, Agent, or Firm—Fenwick & West LLP

[57] ABSTRACT

Data communication packets are processed to determined whether they match network protocols using a parser table and a predictive parser. The parser table is encoded from production rules derived from a network protocol definition. Packets comprise data elements each having an offset from the beginning of the packet and a data value. The parser table is indexed by these offsets and data values, each location in the table containing a value indicating whether a data element at the offset and having the data value is a valid element for the network protocol definition. Once encoded, the parser table is used with the predictive parser which receives data elements of a data packet from a network source. The predictive parser uses the offset and data value of each data element to obtain the encoded value in the parser table. The predictive parser updates a parser stack according to the value from the parser table and the current value of the parser stack. The parser table indicates which offset, value pairs are associated with the end of the data packet or other portion of interest. When the end is reached, the parser stack indicates whether the data packet matched the network protocol definition.

14 Claims, 4 Drawing Sheets

PATTERN RECOGNITION IN DATA COMMUNICATIONS USING PREDICTIVE PARSERS

BACKGROUND

1. Field of Invention

The present invention relates to systems and methods pattern recognition and, more particularly, to systems and methods for analyzing patterns of data in communications.

2. Background of Invention

The predominant model of data communications today is the use of individual packets or frames of data that are routed individually through a network from a source to a destination. This type of service is used in many computer networks. Each packet is comprised a number of layers of protocol headers and data, for one or more network protocols. For each network protocol, the protocol headers and data are generally defined by some number of fixed or variable length fields, each field having predefined value(s). Another way of describing a network protocol is to say that the protocol defines an ordered series of elements, each element having a offset from the beginning of the packet and a data value. Packets conforming to the network protocol must have elements that satisfy the defined data values at their respective offsets. The term "packet" is used herein to described any type of data communication unit that is defined according to a network protocol, including conventional packets, frames (e.g. Ethernet, Token Ring, or FDDI), cells (e.g. ATM), and the like.

It is helpful for network operation, such as traffic analysis, to capture and inspect packets as they travel through a particular location on the network. Inspection is done in order to determine the quantities, distributions, or the like of various types of packets (i.e. what protocols are used), sources, destinations, and so on.

Identification of packets is typically done by simple pattern matching between a pattern or filter defined by the network protocol for the aspect of the packet to be matched, and the relevant portion of the packet being inspected. For example, in a typical local area network (LAN), the traffic may consist of several different types of protocols, such as FTP running on top of IP, Telnet, NFS etc. A LAN protocol analyzer is conventionally used to capture and inspect these packets. However, rather than inspecting all the packets, a system administrator may be interested in, inspecting (e.g. counting) for example, only the FTP packets from a particular Destination IP address.

In a typical protocol analyzer, the pattern matching is done by comparing stored data for network protocols defining an FTP packet including an IP address with the captured data from the network. If there are several pattern matching criteria, as in this example, a pattern for each of these is applied to the captured packet data. This conventional method implies that for multiple (say N) patterns, the data packet has to be scanned N times and compared with the pattern each time. The time required to do these comparison increases proportionally with the number of patterns to be matched ( N ). The space (number of bytes) required to store the pattern data also increases directly proportional to the number of filters ( N ).

This conventional pattern matching process is very slow and time consuming because it requires many multiple comparisons. As a result, packet inspection cannot track/ analyze every packet being transmitting in very high speed (e.g. 100 Mbps) networks, resulting inaccurate analysis of network traffic. Alternatively, to ensure proper analysis, network speeds are limited by the operational speed of the protocol analyzer.

This problem of identification of packets is not limited to inspection for traffic analysis, but also applicable to many other areas of network communication, such as packet assembly and disassembly, routing, and the like. In each of these areas, an analysis of a unit of data must be made to determine whether it matches one or more predetermined patterns, and then appropriate actions are taken. Conventional pattern matching approaches, as outlined above, are thus a significant factor in limiting the speeds at which network communications may operate.

Accordingly, it is desirable to provide a method and system of pattern recognition for data communications that operates at high speed, and is sufficiently flexible and generalized to provide for analysis of a large variety pattern recognition operations and implementations.

SUMMARY OF THE INVENTION

The present invention overcomes the limitations of conventional system and methods by employing language compiler techniques to create a generalized pattern recognition architecture for data communications that is capable of the desired high speeds, and disposable in a variety of different network operations and implementations. The application of compiler techniques to network communications for pattern recognition and data analysis does not appear to have been previously attempted.

Any network protocol must deterministically define the structure of packets formed according to the protocol. A protocol will define precisely the contents of a packet typically using a number of fields. Each field has a known offset from either the start of the packet or the start of the previous field. Offsets may be in bytes, bits, octets, or other units. In particular, the specific order of the fields is defined, each field being followed by a specifically defined set of possible fields, each field having a specifically defined value or set of possible values.

In compiler design, there is what is known as a predictive parser. A predictive parser parses an input string using a parser table. The key features of a predictive parser are 1) for any element of the input string, there is one, and only one possible action to be taken by the parser in response to the value of element in order to decode the element and 2) the parser is non-recursive, so that only one pass through the input is necessary, so that the decoding of an element does not rely on the decoding of any subsequent element, such that no input element is evaluated twice. In other words, the parser can scan through the input from left to right, and at each element of the input, determine precisely what action to take or evaluation to perform on the input in order to decode it.

The parser is able to do this type of analysis through the parser table. Conventionally a parser table is an array in memory indexed by [NT,T], where NT is a non-terminal symbol in the input, and T is a terminal symbol. At each location indexed by [NT,T] the parser table encodes the action to be taken for the specific input combination of nonterminal and terminal. For particular types of grammars (definitions of a language) a parser table can be built, such that a predictive parser can parse the input. These grammars are known as LL(1) grammars.

The present invention applies these principles of language parsing to the identification of data communication packets in network communications, in order to decode and detect valid data packets of various types in high speed communications networks.

More particularly, for a given pattern of data to be identified in a data packet, a parser table is encoded as an array of locations indexed by [M,N] where M is the offset of an element of data in the packet, and N is the value of the data at that offset. At each location in the parser table there is an encoded return value describing whether the element of a data packet at offset M and having value N is part of the network protocol pattern to be matched. Once encoded for any number of network protocols (or portions thereof) the parser table may be stored and used for decoding of data packets in conjunction with a predictive parser.

In a decoding implementation, such as in a protocol analyzer, there is provided the parser table and a predictive parser. Data elements (e.g. octets or bytes) are received by the analyzer from a network source. Each data element has a determined offset value M from the start of the packet and a data value N. These values are used by a predictive parser to look up the encoded value in the parser table at a location indexed by [M,N]. The encoded value indicates whether the data element matches the network protocol.

This encoded value is stored to a one level deep parser stack, which may be efficiently implemented as a memory register, and is updated each time a next data element is evaluated. At the end of reading the data packet, the parser stack indicates whether the data packet matches the desired pattern of data, whether a particular protocol or portion thereof. If so, the packet is syntactically valid with respect to the matched protocol or pattern. Packet counters may then be incremented as appropriate, or other actions taken, such as routing of the packet, or the like. Because the entire method is table driven, a sequence of table lookups, the operation is extremely fast, and suitable to tracking high speed network traffic. Further, the parser table may be encoded to support any number or combination of network protocols with no significant impact on performance time, unlike conventional system which increase computation time proportionally to the number of patterns to be matched.

The parser table is constructed by transformation of a network protocol into a set of production rules. Because of the architecture of network protocols as requiring decoding by state machines, the "grammar" of all network protocols is LL(1). This enables the production rules derived from a network protocol to produce the desired parser table. More particularly, the following transformations are applied to a network protocol.

First, the network protocol is decomposed as a set of terminals T and non-terminals NT. The terminal set defines specific unitary, sequences of data values defined by the network protocol, such as frame delimiters, specific byte codes, and the like. The non-terminal set is defined by particular combinations of terminals and non-terminals.

From the set of terminals and non-terminals, the specific production rules P are derived from the network protocol definition. Each production rule $P_i$ defines the formation of a portion of a data packet given a non-terminal portion. Each production rule Pi is transformed such that each production will left derive only one terminal and one non-terminal. That is, each production rule has the form:

$$P_i: NT_{j \rightarrow Tk} NT_p$$

The left hand side non-terminals are encoded in the production rule so that the value of the non-terminal is the cardinal value of the offset of the terminal on the right hand side of the production. For example in the production:

$$P_i: NT_j \rightarrow T_k NT_p$$

the encoded value of $NT_j$ is 5 if $T_k$ represents the $5^{th}$ byte from the beginning of the packet.

From these production rules, the parser table such is constructed such that the contents of location [m, n] is as follows:

A if there exists a production rule such that m is the encoding of the non-terminal on the left-hand-side and n is the value of the terminal on the right hand side. "A" represents any encoded value indicating a match between a data element at offset m, and value n and the network protocol.

F if there are no productions such that m is the encoding of the non-terminal on the left-hand-side and n is the value of the terminal on the right hand side. "F" represents any encoded valued indicating no match between a data element at offset m, and value n, and the network protocol.

D indicating a "Don't Care" whether a production rule matches the encoding.

$ if there are no more productions.

When constructed in this fashion, the parser table can properly decode any series of data elements to determine whether they were capable of being generated by the production rules of the network protocol. If so, then the series of data elements matches the network protocol. The predictive parser, which is used to read the parser table and update the parser stack therefrom, may operate in conjunction with a semantic engine that responds to the output of the predictive parser and take appropriate actions, such as counting a number of matching data packets, or executing any other complex operations.

The present invention may be implemented in either software or hardware. In a software embodiment, the predictive parser is provided as an executable software application, and the parser table is stored in the RAM or ROM of a computer system. The computer system is conventionally interfaced with a communications network, and data packets therefrom are provided to the predictive parser for decoding. The predictive parser and parser table may be implemented in any variety of software products, such as a protocol analyzer, packet assembler/disassembler, and the like.

In a hardware embodiment, the predictive parser is implemented in an ASIC or other processing device, and the parser table is stored in ROM. The hardware device would be coupled to the network in a conventional manner, and perform the data packet decoding in the manner described. The use of a predictive parser is particularly useful in a hardware implementation. Because there is no backtracking in a predictive parser, the input data stream may be processed serially at a constant rate, without the need for complicated storage of data. This enables the hardware implementation to filter or decode data communications on very high speed networks.

DETAILED DESCRIPTION OF THE INVENTION

Figure 1:
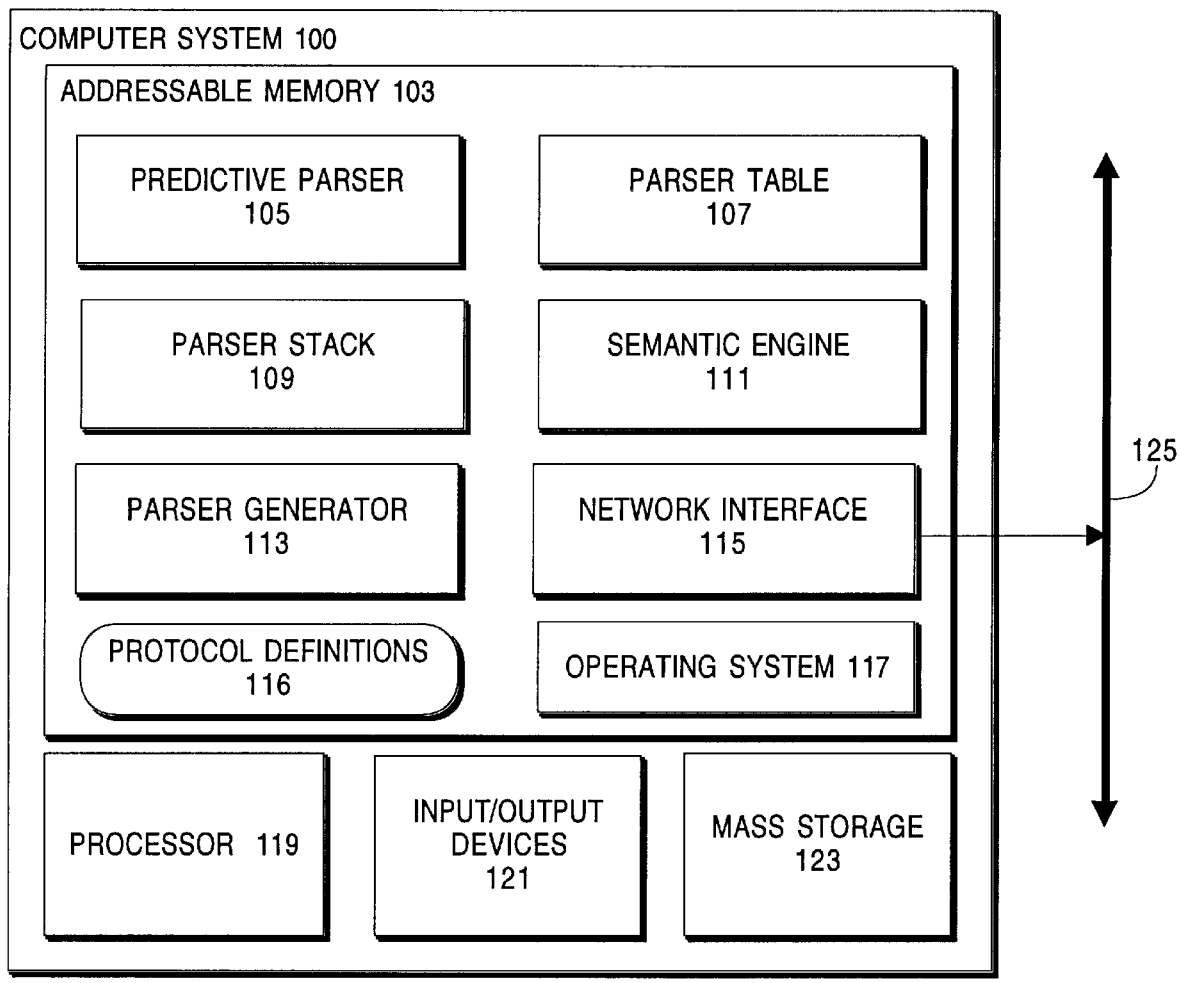
FIG. 1 is an illustration of a system for pattern recognition of data communication packets in accordance with the present invention.

Referring now to FIG. 1, there is shown a system for pattern recognition in data communication packets in accordance with the present invention. The system includes a conventional computer 100, including processor 119, memory 103, and network interface 115 coupled to a conventional communications network 125. For the purpose of decoding a data communications packet, there is stored in the memory 103 a predictive parser 105 and a parser table 107. A parser stack 109 is also maintained in memory, preferably as a memory register for faster operation. A semantic engine 111 operates upon the output of the predictive parser 105 to effect actions in response to detected protocols or other data patterns. The computer 100 includes a conventional operating system 117, input/output devices 121 and mass storage. The computer 100 may be implemented with an Intel based processor operating using Microsoft Corp.'s Windows95™ operating system.

For the purpose of generating the predictive parser 105 and parser table 107, there is also provided a parser generator 113 and a set of one or more protocol definitions 116. Shown here for convenience of explanation, the parser generator 113 is not typically present in a system configured just for decoding data communication packets.

Figure 2:
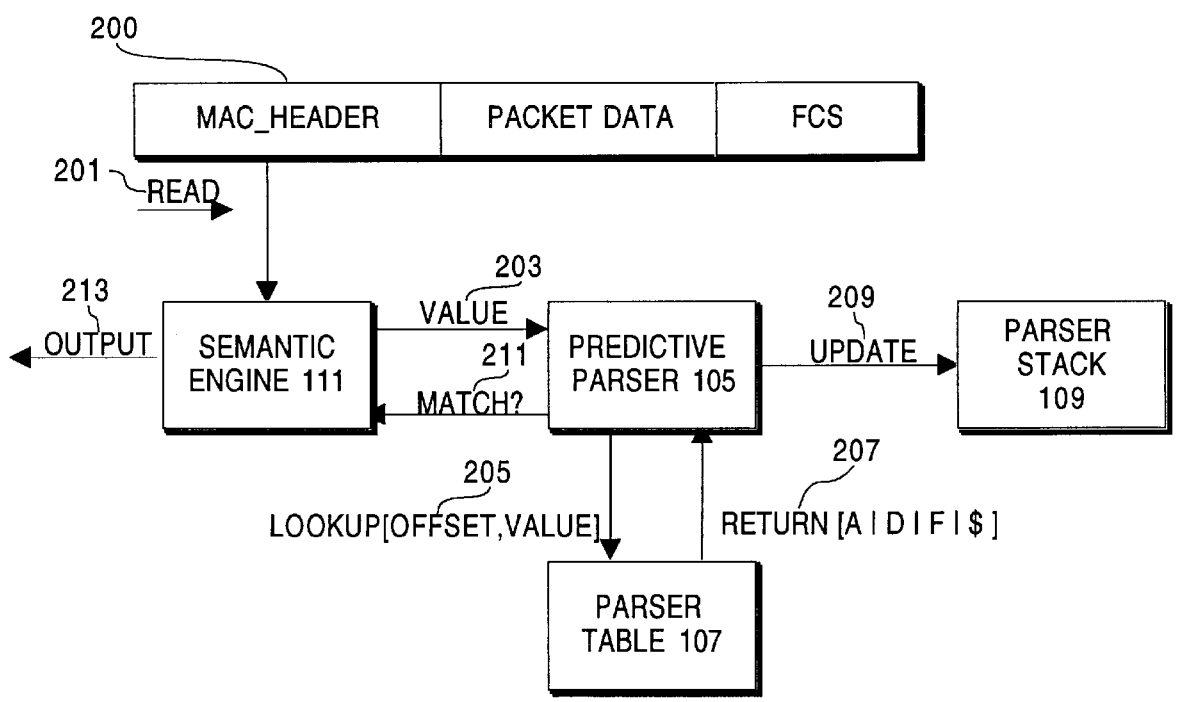
FIG. 2 is a process model of the operation of the system for pattern recognition.

Referring now to FIG. 2, there is shown a process model of the operation of the predictive parser 105 in accordance with the present invention. The computer 100 is coupled to the communications network 125 in a conventional manner, and receives therefrom data communication packets 200 in a conventional manner, which is provided to the semantic engine 111 for processing. The processing by the semantic engine 111 may be packet filtering, decoding, assembly, disassembly, or any other functional operation dependent on packet information.

Each data communication packet 200 comprises a plurality of fields of data. The data is structured into a contiguous series of data elements. Each element has a offset value indicating its distance, in number of element units, from the beginning of the packet 200. Each element further has a value. For example, a packet may be a series of byte data elements, the offset value of a particular element being the number of bytes from the beginning of the packet, and the data value being the byte value of the element. Data elements are not limited to bytes, as other units of data of data may be used to define a packet structure.

Since network protocols are constructed in layers, for example the OSI 7 layer model, and transmitted in header-data sequence for each layer, the grammar of all network protocols is LL(1).

Each data communication packet 200 is read 201 from beginning to end by the semantic engine 111, which passes 203 the value of each data element to the predictive parser 105 for analysis.

In FIG. 2 the packet 200 is shown is an example of one type of data communication packet, here decomposed by its logical fields, and generally includes a MAC header, some amount of packet data, and frame check sequence (FCS). The packet data may in turn include further layers of protocols and fields. The predictive parser 105 has no knowledge of these fields, but rather receives only the data values of the elements which make up these individual fields themselves. The semantic engine 111 passes information to the predictive parser 105 indicating the beginning and length of each packet 200 being processed. For the each data value the predictive parser 105 receives from the semantic engine 111, the predictive parser 105 maintains an index to the offset of the data value from the beginning of the data packet.

The predictive parser 105 uses the offset value and data value of a received element as a lookup 205 into parser table 107. The parser table 107 returns 207 a value indicating whether the data element is match ("A") to a particular network protocol encoded in the parser table 107, not a match ("F"), a Don't Care ("D") or the end ("$") of the packet or relevant portion of the packet to be decoded (since only a portion need be decoded in order to determine whether it matches a particular portion of a protocol). These returned values are here represented symbolically; in an actual implementation the values in the parser table 107 are stored as bit or byte sized flags. In response to each returned value 207 from the parser table 107, the predictive parser 105 updates 209 the parser stack 109 as a state machine, using the current value of the parser stack 109 and the returned value from the parser table 107. When the read portion of the packet 200 is completed, the predictive parser 105 uses the parser stack 109 to determine whether the read portion of the packet 200 matches a particular network protocol or portion thereof. This information is output 211 to the semantic engine 111 which takes any predetermined action in response thereto.

Figure 3:
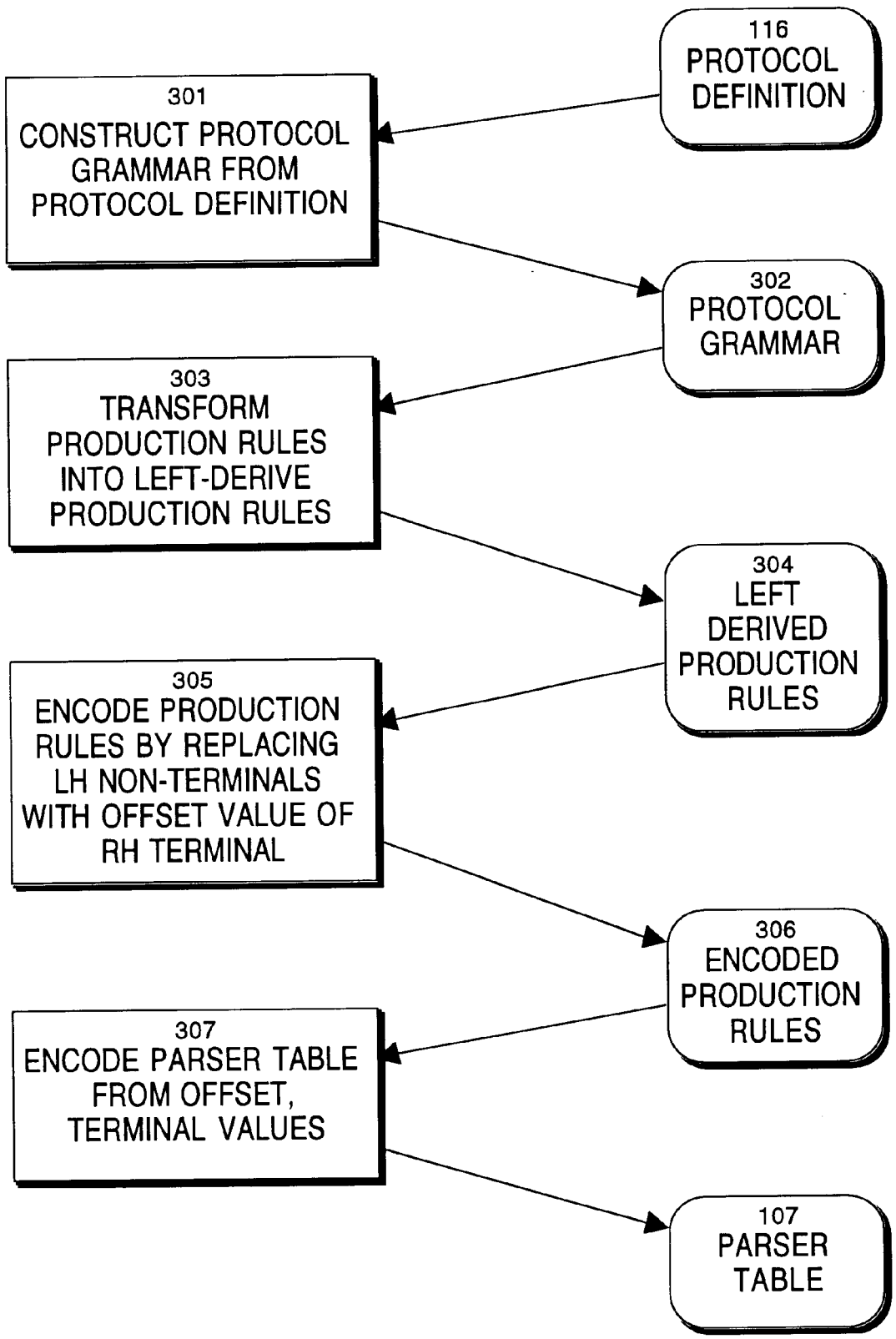
FIG. 3 is a flowgraph of the overall process of constructing the parser table.

Referring now to FIG. 3, there is shown a flowgraph of a logical process of constructing a parser table 107 from a protocol definition. This figure, the accompanying description, is made with respect to an example of encoding a pair of specific network protocols into a parser table 107. Those of skill in the art will appreciate that the example may be generalized to other, more complex implementations. Two protocols are encoded in this example, illustrating that the process may be scaled to any number of protocols or patterns being encoded into the parser table 107, with no resulting increase in decoding speed.

For the purpose of this explanation, assume that the network 125 contains users that are using Ethernet Version 2 Protocol as well as the IEEE-802.2 LLC compliant versions of Ethernet using SNAP headers. As part of network traffic analysis, it is desired to count the number of packets that access the Internet, for example, addressed to specific Internet news groups. This is a packet filtering type of operation. Packets to such groups are formatted according to the Network New Transfer Protocol (NNTP) in addition to the Internet Protocol (IP), here Internet Protocol over Ethernet version 2 (IPEV2). Further assume that it is required that the packet count from the SNAP versions be counted separately from the Ethernet version 2 type packets.

An NNTP packet on IPEV2 is defined as:

<DA>< SA ><IP_Packet-Type ><IP_Header_TCP_Protocol><TCP_Header, NNTP Dest Port><data><FCS> or

```
<DA> <SA> <IP_Packet_Type > < IP_Header_TCP_Protocol > <TCP_Header,
            NNTP Source Port> <data> <FCS>
where:
<DA>                          Destination MAC Address of a Packet
<SA>                          Source MAC Address of a Packet
<IP_Packet_Type>              A Valid IP Packet Type (0800h)
< IP_Header_TCP_Protocol >    A valid IP Header with TCP protocol
                              (06h)
<TCP_Header>                  A valid TCP Header
<NNTP Dest Port>              Destination port number for NNTP (77h)
<NNTP Source Port >           Source port number for NNTP (77h)
<data>                        NNTP data
<FCS>                         Frame Check Sequence for the packet
```

An NNTP packet on IP with SNAP Header is formatted as:

```
<DA> <SA> <Packet Length> <Snap_Packet_Type><Snap_Packet_Header> <
IP_Packet_Type ><IP_Header_TCP_Protocol> <TCP_Header, Dest Port NNTP>
<data> <FCS>
   or
<DA> <SA> <Packet Length> <Snap_Packet_Type><Snap_Packet_Header> <
IP_Packet_Type ><IP_Header_TCP_Protocol> <TCP_Header, Source Port NNTP>
<data> <FCS>
   where:
   <DA>                         Destination MAC Address of a Packet
   <SA>                         Source MAC Address of a Packet
   <Packet Length>              Length of the Packet
   <Snap_Packet_Type>           Valid SNAP packet header
   < IP_Packet_Type >           Valid IP packet identifier (0800h)
   < IP_Header_TCP_Protocol >   A valid IP Header with TCP Protocol
                                (06h)
   <TCP_Header>                 A valid TCP Header
   <Dest Port NNTP>             Destination port number for NNTP
                                (77h)
   <Source Port NNTP>           Source port number for NNTP (77h)
   <data>                       NNTP data
   <FCS>                        Frame Check Sequence for the packet
```

Internet RFC 1042 may be referred to for a detailed description of the SNAP header.

These two separate protocol definitions may be encoded into a parser table 107 for use with a predictive parser 105 in accordance with the present invention to identify and count (or otherwise act upon) packets of either protocol.

Referring again to FIG. 3, a protocol definition 116, such as those defined above, is used to construct 301 a protocol grammar 302 that defines the legal productions of the network protocol. Only packets that satisfy the production of the grammar are syntactically valid for the network protocol.

The protocol grammar is generally constructed with the non-terminal symbol set representing the individual fields of the network protocol that is of interest, and the terminal set representing the terminal in that layer that comprise the non-terminals. The non-terminal set should contain the fewest number of non-terminal symbols needed to create a complete set of production rules. In this manner the protocol grammar matches the level of abstraction of the network protocol that is to be filtered, matched, decoded, or otherwise recognized. For example, if it is desired to identify a TCP header, then the TCP header itself is taken as a non-terminal symbol. If the contents of the TCP header are of specific interest, then the subfields of the TCP header are encoded as non-terminal symbols.

More specifically, the network protocol is decomposed through all of it sublayers, to produce a set of non-terminals for the lowest level fields of the sublayers. The non-terminals are then assembled into higher level non-terminals until a set of non-terminal symbols is achieved for the particular fields of the protocol layer to be identified.

For example, for the above protocol definitions, the production rules of the protocol grammar 302 are as follows:

For the first protocol definition of an NNTP packet over IPV2:

```
P0:    S      ->MAC_header S1
P1:    S1     -> IP_Packet_Type S2
P2:    S2     ->IP_Header_TCP_Protocol S3
P3:    S3     ->TCP_Header_Dst_NNTP S4 |
              TCP_Header_Src_NNTP S4
P4:    S4     ->data_X S5 | S5
P5:    S5     ->FCS
``` and for the second protocol definition for an NNTP packet over IP SNAP:

```
P6:    S1     ->MAC_header S2.1
P7:    S2.1   ->Packet_Length S2.2
P8:    S2.2   ->Snap_Packet_Type S2.3
P9:    S2.3   ->Snap_Packet_Header S2.4
P10:   S2.4   ->IP_Packet_Type S2.5
P11:   S2.5   ->IP_Header_TCP_Protocol S2.6
P12:   S2.6   ->TCP_Header_Dst_NNTP S2.7 |
              TCP_Header_Src_NNTP S2.7
P13:   S2.7   ->data_X S2.8 | S2.8
P14:   S2.8   ->FCS
```

The Terminal symbol (token) set T is a set of any number between 00h and FFh (hexadecimal). This set is defined as:

| | | |
|---|---|---|
| T1: | MAC_header | 12 bytes in frame offset 0 through 11 |
| T2: | Packet Length | Length of the Packet |
| T3: | IP_Packet_Type | Valid IP packet identifier (0800h) |
| T4: | IP_Header_TCP_Protocol | A valid IP Header with TCP Protocol (06h) |
| T5: | TCP_Header_Dst_NNTP | Data byte stream which includes IP and TCP headers and the NNTP destination address (0077h) |
| T6: | TCP_Header_Src_NNTP | Data byte stream which includes IP and TCP headers and the NNTP source address (0077h) |
| T7: | Snap_Packet_Type | Valid SNAP packet header |
| T8: | SNAP_Packet_Header | Data byte stream which includes the SNAP (RFC 1042) header with ethernet type set to 08 00 for IP |
| T8: | data_X | (00-FF)* of data byte stream at any offset of frame |
| T10: | FCS | Frame Checksum |

The terminal set has been chosen to provide the non-terminals at the same definition level as the fields in interest for these protocols. For example, since both the DA and SA form a MAC header, the contents of which are not significant, these can be represented by a single terminal MAC_header defined as any 12 bytes of data in offsets 0–11. The fields following the MAC_header are defined as the first non-terminal S1, which is then broken down in P1 into its constituents components.

The Non-terminal set NT in the production is:

{S, S1, S2, S3, S4, S2.1, S2.2, S2.3, S2.4, S2.5, S2.6, S2.7, S2.8} where "S" is the start symbol.

The protocol grammar 302 is then transformed 303 into left derived production rules, from which the parser table 107 is created. The transformation rules are as follows.

Each production rule $P_i$ in the protocol grammar 302 is transformed such that each production rule will left derive only one terminal and one non-Terminal. That is, each production will be of the form:

$$P_i: NT_j \rightarrow T_k NT_p$$

This is done by taking the right hand side terminal and instantiating it with its value. For example, from the above protocol grammar, the production rule P0:

$$P0: S \rightarrow MAC\_header\ S1$$

is transformed to:

$$P0: S \rightarrow [00\text{-}FF]^{12} S1$$

Since the MAC_header is defined as being 12 bytes of data having any values. That is, only the length of the header is significant to decode the NNTP packets, and not the particular values of the data in these bytes.

Similarly, production rule P1:

$$P1: S1 \rightarrow IP\_Packet\_Type\ S2$$

is transformed to:

$$P1: S1 \rightarrow 08\ 00\ [00\text{-}FF]^9\ S2$$

This is because the desired pattern specifically includes the IP packet header which is defined by the value 08 00 subsequent (in P0) to the MAC_header.

The complete left derived productions 304 are as follows:

| | | |
|---|---|---|
| P0: | S | $\rightarrow [00\text{-}FF]^{12} S1$ |
| P1: | S1 | $\rightarrow 08\ 00\ [00\text{-}FF]^9 S2$ |
| F2: | S2 | $\rightarrow 06\ [00\text{-}FF]^{10} S3$ |
| P3: | S3 | $\rightarrow [00\text{-}FF]^2\ 0077\ [00\text{-}FF]^{16} S4\ \|\ 00\ 77\ [00\text{-}FF]^{18} S4$ |
| P4: | S4 | $\rightarrow [00\text{-}FF]^N S5\ \|\ S5\ //\ N = \text{packet length} - 52 - 4$ |
| P5: | S5 | $\rightarrow [00\text{-}FF]^4$ |
| P6: | $S^1$ | $\rightarrow [00\text{-}FF]^{12} S2.1$ |
| P7: | S2.1 | $\rightarrow [00\text{-}FF]^2 S2.2$ |
| P8: | S2.2 | $\rightarrow AA\ AA\ 03\ S2.3$ |
| P9: | S2.3 | $\rightarrow [00\text{-}FF]^3 S2.4$ |
| P10: | S2.4 | $\rightarrow 08\ 00\ [00\text{-}FF]^9 S2.5$ |
| P11: | S2.5 | $\rightarrow 06\ [00\text{-}FF]^{10} S2.6$ |
| P12: | S2.6 | $\rightarrow [00\text{-}FF]^2\ 0077\ [00\text{-}FF]^{16} S2.7\ \|\ 00\ 77\ [00\text{-}FF]^{18} S2.7$ |
| P13: | S2.7 | $\rightarrow [00\text{-}FF]^P S2.8\ \|\ S2.8\ //\ P = \text{packet length} - 60 - 4$ |
| P14: | S2.8 | $\rightarrow [00\text{-}FF]^4$ |

The non-terminals NT in the left derived production rules 304 are encoded 305 so that the encoded value of the non-terminal NT on the left hand side of the production rules is the cardinal value of the offset of the terminal T on the right hand side of the production. For example in the production:

$$P_i: NT_j \rightarrow T_k NT_p$$

is encoded as:

$$P_i: 5 \rightarrow T_k NT_p$$

Here, the encoded value of $NT_j$ is 5 if $T_k$ represents the $5^{th}$ data element from the beginning of the packet. The encoded value of $NT_j$ is propagated to any other production rule in which $NT_j$ appears on the right hand side. Thus, if $NT_p$ is later encoded in another production rule as with an offset value of 8, then $P_i$ is updated as:

$$P_i: 5 \rightarrow T_k 8$$

This leaves the terminal $T_k$ which has already been substituted to its underlying value.

Referring back the previous example, production rule P0:

$$P0: S \rightarrow [00\text{-}FF]^{12} S1$$

is encoded as:

$$P0: 00 \rightarrow [00\text{-}FF]^{12} S1$$

since the offset value of the 12 bytes of data is 00 bytes from the beginning of the data packet. Likewise, production rule P1:

$$P1: S1 \rightarrow 08\ 00[00\text{-}FF]^9 S2$$

is transformed to:

$$P1: 0C \rightarrow 08\ 00[00\text{-}FF]^9 S3$$

since the value for the IP packet header (08 00) is required to occur at offset 0C. Production rule P0 is then updated to replace S1 with its encoded value from P1:

P0: 00→[00-FF]$^{12}$ 0C

The complete encoding of the production rules P0–P14 from above is:

| P0: | 00 | ->[00-FF]$^{12}$ 0C |
|---|---|---|
| P1: | 0C | ->08 00 [00-FF]$^9$ 17 |
| P2: | 17 | ->06 [00-FF]$^{10}$ 22 |
| P3: | 22 | ->[00-FF]$^2$ 00 77 [00-FF]$^{16}$ 36 \| 00 77 [00-FF]$^{18}$ 36 |
| P4: | 36 | ->[00-FF]$^N$ nn \|nn // N = packet length - 52 - 4, nn = packet length - 4 |
| P5: | nn | ->[00-FF]$^4$ |
| P6: | 00 | ->[00-FF]$^{12}$ 0C |
| P7: | 0C | ->[00-FF]$^2$ 0E |
| P8: | 0E | ->AA AA 03 11 |
| P9: | 11 | ->[00-FF]$^5$ 14 |
| P10: | 14 | ->08 00 [00-FF]$^9$ 1F |
| P11: | 1F | ->06 [00-FF]$^{10}$ 2A |
| P12: | A | ->[00-FF]$^2$ 0077 [00-FF]$^{16}$ S2 \| 00 77 [00-FF]$^{18}$ S2.7 |
| P13: | 3E | ->[00-FF]$^P$ pp \| pp // P = packet length - 60 - 4, pp = packet length - 4 |
| P14: | p | ->[00-FF]$^4$ |

With the production rules in this encoded form, the parser generator 113 is able to construct 307 the parser table 107, encoding for each location [m, n] in the table at least one value indicating whether a data element described by (offset value=m) and (data value=n) is a match for the particular network protocol. The table may be encoded with single value for the entire pattern being matched, or for each individual production rule (in order to determine the presence of specific fields in packet), or any level of resolution in between.

Generally, the contents of a location [m, n] in the parser table 107 is as follows:

A if there exists a production rule such that m is the encoding of the non-terminal on the left-hand-side and n is the value of the terminal on the right hand side. "A" represents any encoded value indicating a match between a data element at offset m, and value n and the network protocol, or production rule.

F if there are no productions such that m is the encoding of the non-terminal on the left-hand-side and n is the value of the terminal on the right hand side. "F" represents any encoded valued indicating no match between a data element at offset m, and value n, and the network protocol, or production rule.

D indicating a "Don't Care" whether a production rule matches the encoding.

$ if there are no more productions.

In the above example, the parser table 107 would be an array indexed by the value [FF, FF]. Each production rule may be encoded in the table, for example:

TABLE 1

Structure of Parser Table

| Offset, Value | P0 | P1 | ... | Pn |
|---|---|---|---|---|
| 00, 00 | | | | |
| ... | | | | |
| FF, FF | | | | |

Or the parser table may be encoded only for tracking the entire protocol match:

TABLE 2

Structure of Parser Table

| Offset, Value | Protocol 1 | Protocol 2 |
|---|---|---|
| 00, 00 | | |
| ... | | |
| FF, FF | | |

The parser generator 113 encodes the table 107 by traversing through the encoded production rules and using the offset value on the left hand side of the production rule and the value of the terminal on the right hand side to determine the encoding of the table.

For production rules that specify any values for some number of offsets, all such offsets are encoded as "D" indicating a "Don't Care," since the offset, value combination does not matter in determining whether the input matches the protocol.

From the last production rule, the offset, data value is encoded as "$" indicating the end of the pattern being matched. Where the left hand side offset is variable specified, as in production rule P4 above with (N=packet length - 4), then parser generator 113 determines the required offset value.

Continuing with the encoded production rules of the above example, the parser table 107 would be:

TABLE 3

Parser Table Example

| [m,n] | P1 | P2 | P3 | P3$^1$ | P8 | P10 | P11 | P12 | P12$^1$ |
|---|---|---|---|---|---|---|---|---|---|
| 0C00 | F | F | F | F | D | D | D | D | D |
| 0C08 | A | A | A | A | D | D | D | D | D |
| 0CFF | F | F | F | F | D | D | D | D | D |
| 0D00 | $ | A | A | A | D | D | D | D | D |
| 0DFF | F | F | F | F | D | D | D | D | D |
| 0E00 | D | D | D | D | F | F | F | F | F |
| 0EAA | D | D | D | D | A | A | A | A | A |
| 0EFF | D | D | D | D | F | F | F | F | F |
| 0F00 | D | D | D | D | F | F | F | F | F |
| 0FAA | D | D | D | D | A | A | A | A | A |
| 0FFF | D | D | D | D | F | F | F | F | F |
| 1000 | D | D | D | D | F | F | F | F | F |
| 1003 | D | D | D | D | $ | A | A | A | A |
| 10FF | D | D | D | D | F | F | F | F | F |
| 1400 | D | D | D | D | D | F | F | F | F |
| 1408 | D | D | D | D | D | A | A | A | A |
| 14FF | D | D | D | D | D | F | F | F | F |
| 1500 | D | D | D | D | D | $ | A | A | A |
| 15FF | D | D | D | D | D | F | F | F | F |
| 1700 | D | F | F | F | D | D | D | D | D |
| 1706 | D | $ | A | A | D | D | D | D | D |
| 17FF | D | F | F | F | D | D | D | D | D |
| 1F00 | D | D | D | D | D | D | F | F | F |
| 1F06 | D | D | D | D | D | D | $ | A | A |
| 1FFF | D | D | D | D | D | D | F | F | F |
| 2200 | D | D | A | D | D | D | D | D | D |
| 22FF | D | D | F | D | D | D | D | D | D |
| 2300 | D | D | F | D | D | D | D | D | D |
| 2377 | D | D | $ | D | D | D | D | D | D |
| 23FF | D | D | F | D | D | D | D | D | D |
| 2400 | D | D | D | A | D | D | D | D | D |
| 24FF | D | D | D | F | D | D | D | D | D |
| 2500 | D | D | D | F | D | D | D | D | D |
| 2577 | D | D | D | $ | D | D | D | D | D |
| 25FF | D | D | D | F | D | D | D | D | D |
| 2A00 | D | D | D | D | D | D | D | A | D |
| 2AFF | D | D | D | D | D | D | D | F | D |
| 2B00 | D | D | D | D | D | D | D | F | D |
| 2B77 | D | D | D | D | D | D | D | $ | D |
| 2BFF | D | D | D | D | D | D | D | F | D |

TABLE 3-continued

Parser Table Example

| [m,n] | P1 | P2 | P3 | P3[1] | P8 | P10 | P11 | P12 | P12[1] |
|---|---|---|---|---|---|---|---|---|---|
| 2C00 | D | D | D | D | D | D | D | D | A |
| 2CFF | D | D | D | D | D | D | D | D | F |
| 2D00 | D | D | D | D | D | D | D | D | F |
| 2D77 | D | D | D | D | D | D | D | D | $ |
| 2DFF | D | D | D | D | D | D | D | D | F |

In this parser table, the focus is on the productions of interest. In this case, the patterns that are being matched are NNTP over IP EV2 (P3) or NNTP over IP SNAP (P12). For illustration purposes, the table includes production rule encoding for P1, P2, P3, P3[1], P8, P10, P11, P12 and P12[1]. (p3[1] and P12[1] in Table 3 refer to second disjunct of the encoded production rules). "D" in the above table indicates "Don't Care". P3, P3[1], P12 and P12[1] are the filter rules that apply for the source/destination combination of NNTP over IP EV2 and over IP SNAP. All other locations not given in the above table will have a value of "D" for all the columns.

In a preferred embodiment, 4 states are encoded for each item (e.g. protocol or production rule) being matched, using 2 bits:

TABLE 4

State Encoding

| 00 | No Match (F) |
| 01 | Don't Care (D) |
| 10 | Match (A) |
| 11 | Done ($) |

For the above examples

Filter$_1$: NNTP over IPV2

Filter$_2$: NNTP over IP SNAP

The parser table 107 and the contents of each location therein is given in Table 1:

TABLE 5

Parser Table with State Encoding

| Location [offset, value] | Filter$_1$ | Filter$_2$ |
|---|---|---|
| 00 00 | 01 | 01 |
| 00 01 | 01 | 01 |
| ... | ... | ... |
| 0C 00 | 00 | 01 |
| 0C 01 | 00 | 01 |
| ... | ... | ... |
| 0C 07 | 00 | 01 |
| 0C 08 | 10 | 01 |
| 0C 09 | 00 | 01 |
| ... | ... | ... |
| 0C FF | 00 | 01 |
| 0D 00 | 10 | 01 |
| 0D 01 | 00 | 01 |
| ... | ... | ... |
| 0D FF | 00 | 01 |
| 0E 00 | 01 | 00 |
| 0E 01 | 01 | 00 |
| ... | ... | ... |
| 0E AA | 01 | 10 |
| 0E AB | 01 | 00 |
| ... | ... | ... |
| 0F 00 | 01 | 00 |
| 0F AA | 01 | 10 |
| 0F AB | 01 | 00 |

TABLE 5-continued

Parser Table with State Encoding

| Location [offset, value] | Filter$_1$ | Filter$_2$ |
|---|---|---|
| ... | ... | ... |
| 10 00 | 01 | 00 |
| 10 01 | 01 | 00 |
| 10 02 | 01 | 00 |
| 10 03 | 01 | 10 |
| 10 04 | 01 | 00 |
| ... | ... | ... |
| 14 07 | 01 | 00 |
| 14 08 | 01 | 10 |
| 14 09 | 01 | 00 |
| ... | ... | ... |
| 14 FF | 01 | 00 |
| 15 00 | 01 | 10 |
| 15 01 | 01 | 00 |
| 17 05 | 00 | 01 |
| 17 06 | 10 | 01 |
| 17 07 | 00 | 01 |
| ... | ... | ... |
| 2B 06 | 01 | 10 |
| 21 FF | 00 | 01 |
| 22 00 | 10 | 01 |
| 22 01 | 00 | 01 |
| ... | ... | ... |
| 22 FF | 00 | 01 |
| 23 00 | 00 | 01 |
| ... | ... | ... |
| 23 77 | 10 | 01 |
| 23 78 | 00 | 01 |
| ... | ... | ... |
| 23FF | 00 | 01 |
| 2400 | 10 | 01 |
| ... | ... | ... |
| 24FF | 00 | 01 |
| 2500 | 00 | 01 |
| ... | ... | ... |
| 2577 | 10 | 01 |
| ... | ... | ... |
| 25FF | 00 | 01 |

The parser table encoding is setting the appropriate bits (for Filter$_1$ and Filter$_2$) based on what underlying production rules P0–P14 specify. For example, location [0C, 08] has the value "10 01" which means it is a match for Filter$_1$ and a don't care for Filter$_2$.

After the offset location that represents the last element of the filter to match is encoded, the rest of the table locations for that filter is filled with "00". The last offset location value will have the "done" bit set for the filter. After the done bit is set (while parsing) for a filter, the rest of the locations for that filter can be ignored as the filter is matched to the input data.

In one embodiment, the protocol definitions 116 are pre-encoded and stored as encoded production rules 306. This allows the parser table 107 to be encoded directly therefrom by the parser generator 113. To provide this embodiment, the protocol definitions 116 may be stored in the following syntax:

<pattern identifier> <name> <offset, value>* where:

<pattern identifier>  Identifies the name of the pattern or protocol being defined -continued

| | |
|---|---|
| <name> | Name of the portion of the pattern, such as a name of a field in a protocol |
| <offset, value>* | Offset identifies the unit (e.g. byte) offset from the beginning of the packet, value specifies the value of the data element at offset. The pairs are conjunctive, so that all specified values must be present in the packet to identify this particular pattern. |

For example, for Internet Protocol EV2 and SNAP, the protocol definitions are:

<IP_EV2> <"Internet Protocol EV2"> <0C 08, 0D 00>

<IP_SNAP> <"Internet Protocol SNAP"> <14 08, 15 00>

Using this basic structure, any complex protocol definition can be assembled. From these protocol definitions 116, the parser table 107 is directly encoded for each pattern identifier as a production rule (column), and using the <offset, value> pairs as the locations (rows) in the parser table 107 that are encoded as "matches".

For offset, values not listed in the production rules, the encoding is as explained above. For a given offset, any value other than the required value in the input is encoded as a F or "no match." This is because if some other value than the required value appears at the offset, then the input data does not match the defined pattern. For any offset that is not specified in the pattern definition, all values at that offset are encoded as "Don't Care" for the particular filter (i.e. column). For the last production definition, the <offset, value> is encoded as a Done, rather than as a regular match.

In this manner, the parser table 107 may be encoded as needed in response to user inputs to the system 100 during runtime. A user interface to the parser generator 113 provides a list of protocols, fields, and other patterns, which the user may desire to detect. Each of these is associated with one or more protocol definitions 116. Upon selection of the desired protocols or patterns, the parser generator 113 uses the underlying protocol definitions 116 to generate the appropriate parser table 107, which is stored in memory for use by the predictive parser 105 during decoding.

Referring again to FIG. 2, the predictive parser 105 uses the parser table 107 to decode each data element in a packet 200, and updates the parser stack 109 accordingly. The parser stack 109 is updated using a state machine based on the current value of the stack and the decoded value from the parser table 107. One of the benefits of the present invention is that the encoding of the parser table 107 allows the parser stack 109 to be only one level deep, effectively a single memory register. As a result, when the end of a data packet 200 is reached, the parser stack 109 specifies whether or not the packet matched a particular protocol definition. This enables the predictive parser 105 to very quickly and efficiently decode any packets.

Given the use of 2 bits for encoding the state of each pattern, the parser stack 109 is initialized with 2 bits for each pattern to be matched. Thus, for the above example of two patterns, the parser stack 107 is 1 level deep and has 4 bits representing the 2 filters Filter₁ and Filter₂. To begin with, before the predictive parser 105 is invoked, the parser stack 109 is initialized to "01 01." The state machine for the parser stack 109 is given in the following table:

TABLE 6

Parser Stack State Machine

| Current Stack Value | Parse Table Value | Next Stack Value |
|---|---|---|
| 00 00 | 00 00 | 00 00 |
| 00 00 | 01 01 | 00 00 |
| 00 00 | 10 10 | 00 00 |
| 00 00 | 11 11 | 00 00 |
| 01 01 | 00 00 | 00 00 |
| 01 01 | 01 01 | 01 01 |
| 01 01 | 10 10 | 10 10 |
| 01 01 | 11 11 | 11 11 |
| 10 10 | 00 00 | 00 00 |
| 10 10 | 01 01 | 10 10 |
| 10 10 | 10 10 | 10 10 |
| 10 10 | 11 11 | 11 11 |
| 11 11 | 00 00 | 11 11 |
| 11 11 | 01 01 | 11 11 |
| 11 11 | 10 10 | 11 11 |
| 11 11 | 11 11 | 11 11 |

Figure 4:
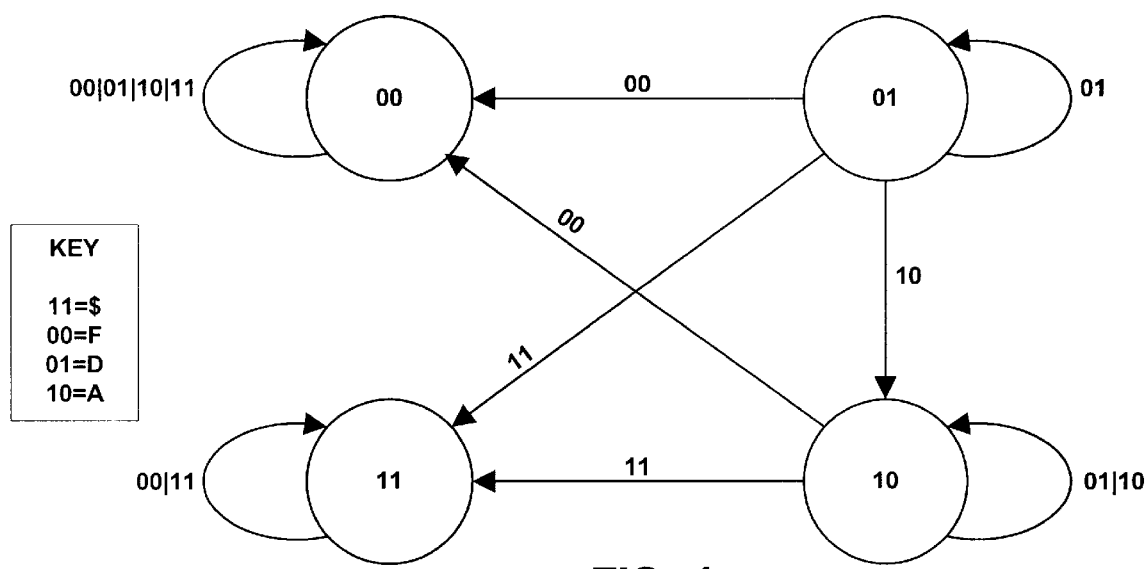
FIG. 4 is an illustration of a state machine for the parser stack.

FIG. 4 illustrates the state machine for the parser stack 109.

At the end of parsing a given data packet 200, the parser stack 109 will indicate which filters were matched, if any. If the bits are '00' for a given filter, then there was no match for the filter. If the bits are set to '11' then the data packet 200 matched the filter. This is shown in the following table:

TABLE 7

Parser Stack Output

| Parser Stack Value | Bits-0,1 Filter₁ | Bit2–3 Filter₂ |
|---|---|---|
| 00 00 | No Match | No Match |
| 01 01 | No Match | No Match |
| 10 10 | Match | Partial Match |
| 11 11 | Match | Complete Match |

The output of the parser stack 109 is passed to the semantic engine 111, which performs an appropriate action, such as incrementing a packet count, or other management, assembly, disassembly, or analytical action.

In a hardware embodiment, the parser table may be encoded in a read only memory (ROM) using the protocol definition and production rules for a large number of well known protocols. The predictive parser is then implemented using a microprocessor and microcoded instructions, or by dedicated gates in a FPGA or other programmable logic device. The parser stack is implemented as either a single memory register, and updated by the predictive parser as described. In such a hardware embodiment, the present invention is deployed with a network tap for receiving and directly decoding network communications.

The present invention provides a high speed solution to the decoding and pattern detection of any arbitrary pattern of data in data communications, or any real time data stream. Unlike conventional filters in which decoding time is directly proportional to the number of filters being matched, the processing time for decoding using the parser table increases only marginally for additional protocols or pattern definitions, thus enabling many such patterns to be encoded in a parser table (or multiple parser table) while still providing for high speed decoding and pattern detection.

We claim:

1. A computer implemented method of parsing a data communication packet comprising a plurality of data elements, each data element having a data value and an offset value from a beginning of the packet, the method comprising:

transforming a network protocol into a plurality of production rules that define all valid data communication packets for the network protocol, each production rule defining an offset value from a beginning of a data communication packet, and at least one data value that must appear at the offset value for the data communication packet to be valid for the network protocol;

storing a parser table encoded from the production rules, including for each location in the parser table indexed by a selected offset value and data value, a return value indicating whether a data communication packet having a data element with the data value at the selected offset value is a match for a production rule of the network protocol;

receiving the data communication packet; and applying each data element of the data communication packet to the parser table to obtain the return value indicating whether the data element at the offset value matches the network protocol, wherein the data communication packet can be determined to be consistent with the network protocol from one or more of the obtained return values.

2. The method of claim 1, wherein storing in the location a return value further comprises:

for each production rule, storing in the parser table at the location indexed by the offset value and data value of the production rule a return value indicating a match to the production rule;

for each production rule, storing in the parser table at the location indexed by the offset value and data value of the production rule a return value indicating that a match is not required;

for a last production rule, storing in the parser table at the location indexed by the offset value and data value of the production rule a return value indicating that the last production rule has been matched; and for each location in the parser table indexed by an offset value appearing in a production rule and by a data value not appearing in the same production rule, storing in the location a return value indicating a failure to match the production rule.

3. The method of claim 1, wherein applying each element of the data communication packet to the parser table, comprises:

determining the offset value and the data value of the data element; and using the offset value and the data value to lookup the return value in the parser table at the location indexed by the offset value and data value, the return value indicating whether the data element matches a production rule derived from the network protocol.

4. The method of claim 3, further comprising:

updating one level deep parser stack to store a value indicating whether the data communication packet matches the network protocol, using a current value of the parser stack and the return value from the parser table.

5. The method of claim 1, wherein storing a parser table encoded from the production rules further comprises:

storing for each location of the parser table, according to the offset value and data value which indexes the location:

a first value if there exists a production rule such that the offset value is the encoding of a non-terminal of the production rule and the data value is the value of a terminal of the production rule;

a second value if there are no productions of the production rules such that the offset value is the encoding of the non-terminal, and the data value is the value of the terminal of the production rule;

a third value indicating a "Don't Care" condition if it is not necessary for any production rule to match the encoding of the offset value and the data value; and a fourth value if there are no more productions.

6. A computer implemented method of parsing a data communication packet comprising an ordered plurality of data elements, each data element having a data value N and an offset value M from a beginning of the packet, the method comprising:

storing a parser table having a plurality of locations, each location storing a return value indicating whether an element at offset value M and having data value N conforms to a production rule derived from a network protocol;

receiving a packet having an ordered plurality of data elements; and, applying each data element of the data communication packet to the parser table at the location corresponding to its data value and the offset value to obtain the return value indicating whether the data element matches a production rule derived from the network protocol, wherein the data communication packet can be determined to be consistent with the network protocol from one or more of the obtained return values.

7. A method for constructing a parser table from a network protocol, the network protocol defining a valid data communication packet as an ordered plurality of data elements, each data element having an offset value M from the beginning of the packet and a data value N, the method comprising:

creating a parser table having a plurality of locations, each location indexed by (M,N); and, for each (M,N) location, storing a value in the location indicating whether a data element at offset value M and having data value N is a data element of a valid data communication packet for the network protocol, wherein a data communication packet can be determined to be consistent with the network protocol from one or more of the value obtained by applying the data elements of the data communication packet to the parser table according to their offset values M and data values N.

8. The method of claim 7, further comprising:

storing a plurality of production rules $P_n$ that define all valid data communication packets for the network protocol, each production rule defining an offset value M from a beginning of a data communication packet, and at least one data value N that must appear at the offset value M for the data communication packet to be valid for the network protocol;

for each production rule $P_i, i \leq n$, storing in the parser table at the location indexed by the offset value M and data value N of the production rule $P_i$ a return value indicating a match to the production rule $P_i$;

for each production rule $P_i, i \leq n$, storing in the parser table at the location indexed by the offset value M and data value N of the production rule $P_i$ a return value indicating that a match is not required to the production rule $P_i$;

for a last production rule $P_n$, storing in the parser table at the location indexed by the offset value M and data value N of the last production rule $P_n$ a return value indicating that the last production rule $P_n$ has been matched; and for each location in the parser table indexed by an offset value appearing in any production rule Pi and by a data value not appearing in the same production rule $P_i$, storing in the location a return value indicating a failure to match any production rule.

9. An apparatus for determining whether a data communication packet is a valid data communication packet for a network protocol, the data communication packet comprising a plurality of data elements, each data element having a data value and an offset value from a beginning of the packet, the apparatus comprising:

a parser table having a plurality of locations, each location indexed by a offset value and data value and storing a return value indicating whether a data communication packet having a data element with a data value at the offset value is a data element of a valid data communication packet for the network protocol;

a parser stack for storing a stack value indicating whether the data communication packet is valid data communication packet defined by the network protocol; and a predictive parser that receives each data element of the data communication packet, and for each data element, reads the return value from the parser table at the location indexed by the offset value and data value of the data element, the predictive parser updating the parser stack with a new stack value as a function of a current stack value and the return value from the parser table, wherein the stack value in the parser stack indicates whether the data communication packet is valid for the network protocol.

10. The apparatus of claim 9, wherein the parser table further comprises for each location indexed by an offset value of a data element from a beginning of a packet and a data value of the data element a return value selected from the group consisting of:

a first value indicating a match between the data element at offset value and the network protocol;

a second value indicating no match between the data element at offset value and the network protocol;

a third value indicating a "Don't Care" condition as to whether the data element at the offset value matches the network protocol; and a fourth value indicating there are no more data elements to be matched.

11. A computer implemented method of determining whether a real time data stream having an ordered plurality of data elements matches a pattern definition defining a valid pattern of data elements in the real time data stream, the method comprising:

storing a parser table having a plurality of locations, each location indexed by a selected offset value and data value and storing a return value indicating whether a real time data stream having a data element with a data value at the offset value is a valid pattern defined by the pattern definition;

receiving a real time data stream having an ordered plurality of data elements; and applying each data element of the real time data stream to the parser table according to its data value and offset value to obtain the return value indicating whether the data element is a data element of a valid pattern defined by the pattern definition, wherein the real time data stream can be determined to be consistent with the pattern definition from one or more of the obtained return values.

12. The method of claim 11, further comprising:

transforming the pattern definition into a plurality of production rules that define a valid pattern of data elements for the pattern definition, each production rule defining an offset value from a beginning of the real time data stream, and at least one data value that must appear at the offset value for the real time data stream to be a valid pattern for the pattern definition.

13. A computer program product for determining whether a data communication packet is a valid data communication packet for a network protocol, the data communication packet comprising a plurality of data elements, each data element having a data value and an offset value from a beginning of the packet, the computer program product comprising:

a computer readable medium;

a parser table stored on the computer readable medium and having a plurality of locations, each location indexed by a offset value and data value and storing a return value indicating whether a data communication packet having a data element with a data value at the offset value is a data element of a valid data communication packet for the network protocol;

a parser stack stored on the computer readable medium, for storing a stack value indicating whether the data communication packet is valid data communication packet defined by the network protocol; and a predictive parser stored on the computer readable medium, and executable by a processor, that receives each data element of the data communication packet, and for each data element, reads the return value from the parser table at the location indexed by the offset value and data value of the data element, the predictive parser updating the parser stack with a new stack value as a function of a current stack value and the return value from the parser table, wherein upon reading a last one of the data elements of the data communication packet, the stack value in the parser stack indicates whether the data communication packet is valid for the network protocol.

14. A computer system for determining whether a data communication packet is a valid data communication packet for a network protocol, the data communication packet comprising a plurality of data elements, each data element having a data value and an offset value from a beginning of the packet, system comprising:

a parser table stored on a computer readable medium and having a plurality of locations, each location indexed by a offset value and data value and storing a return value indicating whether a data communication packet having a data element with a data value at the offset value is a data element of a valid data communication packet for the network protocol;

means for receiving the data communication packet; and means for applying each data element of the data communication packet to the parser table to obtain the return value indicating whether the data element at the offset value matches a portion of the network protocol, wherein the data communication packet can be determined to be consistent with the network protocol from one or more of the obtained return values.

* * * * *

UNITED STATES PATENT AND TRADEMARK OFFICE
CERTIFICATE OF CORRECTION

PATENT NO.    : 5,916,305  
DATED         : June 29, 1999  
INVENTOR(S)   : Sikdar et al.

Page 1 of 3

It is certified that error appears in the above-identified patent and that said Letters Patent is hereby corrected as shown below:

Column 1,
Line 8, after "methods" insert -- for --
Line 16, after "comprised" insert -- of --
Line 27, replace "described" with -- describe --
Line 46, replace "in, inspecting" with in -- inspecting, --
Line 58, replace "comparison" with -- comparisons --
Lines 60 and 62, replace "( N)" with -- ($\alpha$ N) --
Line 66, replace "transmitting" with -- transmitted --
Line 67, before "inaccurate" insert -- in --

Column 2,
Line 17, after "variety" insert -- of --

Column 3,
Line 38, replace "system" with -- systems --
Line 58, replace "Pi" with -- $P_i$ --
Line 61, replace "Pi: $NT_{j \to Tk} NT_p$" with -- Pi: $NT_j \to T_k NT_p$ --

Column 4,
Line 6, after "table" remove "such"

Column 5,
Line 21, after "processor" remove "operating"
Line 49, after "units of data" remove "of data"
Line 59, before "shown" remove "is"

Column 6,
Line 8, before "each" remove "the"
Line 16, before "match" insert -- a --
Line 63, replace "<DA><SA><1P_Packet-Type><IP_Header_TCP_Protocol><TCP_Header, NNTP Dest Port><data>FCS> or" with -- <DA> <SA> <IP_Packet Type> <IP_Header_TCP Protocol> <TCP_Header, NNTP Dest Port> <data>FCS> or --

UNITED STATES PATENT AND TRADEMARK OFFICE
CERTIFICATE OF CORRECTION

PATENT NO.     : 5,916,305
DATED          : June 29, 1999
INVENTOR(S)    : Sikdar et al.

It is certified that error appears in the above-identified patent and that said Letters Patent is hereby corrected as shown below:

Column 7,
Line 21, replace "<Snap_Packet_Type><Snap_Packet_Header>" with
-- <Snap_Packet_Type> <Snap_Packet <_Header> --
Line 22, replace "IP_Packet_Type><IP Header" with -- IP_Packet_Type> < IP_Header --.
Line 25, replace "<Snap_Packet_Type><Snap Packet Header>" with
-- <Snap_Packet_Type> <Snap Packet Header> --
Line 26, replace "IP_Packet_Type><IP_Header" with -- IP_Packet_Type> < IP_Header --.
Line 65, before "sublayers" change "it" to -- its --

Column 9,
Line 27, replace "constituents" with -- constituent --
Line 33, replace "start" with -- *start* --

Column 10,
Line 8, replace "F2:" with -- P2: --
Line 45, after "back" insert -- to --

Column 11,
Line 13, after "->[00-FF]$^N$" replace "nn |nn" with -- nn | nn --
Line 19, after "[00-FF]$^{16}$" replace "S2" with -- S2.7 --
Line 29, after "with" insert -- a --

Column 12,
Line 18, replace "offset," with -- offset --

Column 13,
Line 17, replace "(p3$^1$" with -- P3$^1$ --
Line 40, replace "Table 1" with -- Table 5 --

Column 14,
Line 47, after "filter" replace "is" with -- are --

Column 15,
Line 26, replace "offset," with -- offset --
Line 29, replace "other value than" with -- value other than --

UNITED STATES PATENT AND TRADEMARK OFFICE
CERTIFICATE OF CORRECTION

PATENT NO. : 5,916,305
DATED : June 29, 1999
INVENTOR(S) : Sikdar et al.

It is certified that error appears in the above-identified patent and that said Letters Patent is hereby corrected as shown below:

Column 16,
Line 60, replace "parser table)" with -- parser tables) --

Column 18,
Lines 54 and 58, after "rule" replace "$P_i i \leq n$" with -- $P_i$ $i \leq n$ --

Column 19,
Line 2, replace "Pi" with -- $P_i$ --

Signed and Sealed this

Thirtieth Day of March, 2004

JON W. DUDAS
*Acting Director of the United States Patent and Trademark Office*